(12) United States Patent
Weast (10) Patent No.: US 9,407,961 B2
(45) Date of Patent: Aug. 2, 2016

(54) MEDIA STREAM SELECTIVE DECODE BASED ON WINDOW VISIBILITY STATE

(75) Inventor: John C. Weast, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 86 days.

(21) Appl. No.: 13/618,193

(22) Filed: Sep. 14, 2012

(65) Prior Publication Data

US 2014/0078402 A1 Mar. 20, 2014

(51) Int. Cl.
*H04N 5/445* (2011.01)
*H04N 21/454* (2011.01)
*H04N 21/439* (2011.01)
*H04N 21/442* (2011.01)
*H04N 21/443* (2011.01)

(52) U.S. Cl.
CPC ......... *H04N 21/4542* (2013.01); *H04N 21/439* (2013.01); *H04N 21/4438* (2013.01); *H04N 21/44218* (2013.01)

(58) Field of Classification Search
CPC .................. H04N 22/42201; H04N 22/44218; H04N 22/4436; H04N 21/4542; H04N 21/439; H04N 21/44218; H04N 21/4438
USPC ................................ 725/25, 28, 43; 348/730
See application file for complete search history.

(56) References Cited

U.S. PATENT DOCUMENTS

| | | | | |
|---|---|---|---|---|
| 6,361,173 B1 * | 3/2002 | Vlahos et al. | ................... | 353/97 |
| 6,542,165 B1 * | 4/2003 | Ohkado | ................ | 715/751 |
| 6,559,813 B1 * | 5/2003 | DeLuca et al. | ................... | 345/8 |
| 7,757,252 B1 * | 7/2010 | Agasse | .................... | 725/41 |
| 7,917,773 B2 * | 3/2011 | Xu et al. | ................... | 713/300 |
| 8,054,319 B2 * | 11/2011 | Lee | ................ | H04N 5/45 345/620 |
| 8,098,330 B2 * | 1/2012 | Ferri et al. | ................... | 348/564 |
| 8,212,842 B2 * | 7/2012 | Shiomi | .................... | G06F 3/14 345/629 |
| 8,269,754 B2 * | 9/2012 | Nagata | .......................... | 345/207 |
| 8,405,679 B2 * | 3/2013 | Murtagh | ...................... | 345/629 |
| 8,949,894 B2 * | 2/2015 | Lee | .......................... | G09G 5/14 725/41 |
| 2003/0142108 A1 * | 7/2003 | Brown et al. | ................. | 345/589 |
| 2004/0073935 A1 * | 4/2004 | Kang | .............................. | 725/88 |
| 2006/0085121 A1 * | 4/2006 | Jeong | ........................... | 701/200 |
| 2006/0236342 A1 * | 10/2006 | Kunkel et al. | ................... | 725/52 |
| 2006/0245734 A1 * | 11/2006 | Amano et al. | .................. | 386/96 |
| 2007/0033533 A1 * | 2/2007 | Sull | .............................. | 715/752 |
| 2007/0120829 A1 * | 5/2007 | Ono | ................ | 345/169 |
| 2007/0121012 A1 * | 5/2007 | Hida | ..................... | G06F 3/1431 348/589 |
| 2007/0217130 A1 * | 9/2007 | Eri | ......................... | G06F 1/3218 361/679.26 |
| 2007/0236363 A1 * | 10/2007 | Hamada | ................. | H04N 7/002 340/901 |
| 2007/0247524 A1 * | 10/2007 | Yoshinaga et al. | ............. | 348/78 |

(Continued)

FOREIGN PATENT DOCUMENTS

JP 2008-244917 A * 10/2008 ............... H04N 5/44

*Primary Examiner* — An Son P Huynh
(74) *Attorney, Agent, or Firm* — Jordan IP Law, LLC (57) ABSTRACT

Systems and methods may determine a visibility state of an application window associated with a media stream, and selectively decode a media stream based on a visibility state. One or more decode operations with respect to media content, such as video content, may be prevented if a visibility state indicates that at least a portion of an application window includes a blocked state. One or more decode operations with respect to media content, such as video content, may be permitted if a visibility state indicates that at least a portion of an application window includes a visible state. The systems and methods result in benefits to resource utilization, such as processor utilization, power consumption, and so on.

26 Claims, 6 Drawing Sheets

(56) References Cited

U.S. PATENT DOCUMENTS

| | | | |
|---|---|---|---|
| 2008/0066103 A1* | 3/2008 | Ellis et al. ........................ 725/38 |
| 2008/0109725 A1* | 5/2008 | Lee et al. ........................ 715/716 |
| 2008/0172693 A1* | 7/2008 | Ludvig ............................ 725/40 |
| 2009/0019491 A1* | 1/2009 | Kulas ............................. 725/44 |
| 2009/0070404 A1* | 3/2009 | Mazzaferri .................... 709/202 |
| 2010/0037175 A1* | 2/2010 | West ..................... G06F 3/0481 715/788 |
| 2010/0260479 A1* | 10/2010 | Watanabe et al. ................ 386/95 |
| 2010/0293584 A1* | 11/2010 | Civanlar et al. ............... 725/109 |
| 2010/0295839 A1* | 11/2010 | Nagaya et al. ................. 345/212 |
| 2011/0080519 A1* | 4/2011 | Chowdhry et al. ............. 348/453 |
| 2011/0138439 A1* | 6/2011 | Toba ............................ 725/148 |
| 2011/0141124 A1* | 6/2011 | Halls ....................... G06F 21/83 345/522 |
| 2011/0145708 A1* | 6/2011 | Bhogal et al. .................. 715/716 |
| 2011/0206353 A1* | 8/2011 | Yeo ............................... 386/291 |
| 2012/0102428 A1* | 4/2012 | Stewart ................... G06F 3/038 715/781 |
| 2012/0174012 A1* | 7/2012 | Tsai ...................... G06F 3/0486 715/769 |
| 2012/0179325 A1* | 7/2012 | Faenger ........................ 701/31.4 |
| 2012/0242692 A1* | 9/2012 | Laubach .................... G09G 5/14 345/629 |
| 2013/0024812 A1* | 1/2013 | Reeves .................. G06F 3/1423 715/810 |
| 2013/0139103 A1* | 5/2013 | Laborczfalvi ......... G06F 3/0484 715/794 |
| 2013/0290993 A1* | 10/2013 | Cheung et al. ................. 725/10 |

* cited by examiner

MEDIA STREAM SELECTIVE DECODE BASED ON WINDOW VISIBILITY STATE

BACKGROUND

Consumer electronics platforms such as smart televisions (TVs), laptops, tablets, cell phones, etc., may decode and/or render media streams from a variety of sources, including online media servers, disk drives, hard drives, etc., wherein a media stream may include one or more types of media content, such as video content and audio content. While certain media platforms may attempt to enhance playback performance or reduce media pipeline bottlenecks, such solutions are typically based on a premise that the underlying content, such as video content, necessarily is to be decoded and displayed. Simply put, once playback begins, conventional media platforms decode and display all content of a media stream irrespective of an individual's actual use of or attention to the content, unless the individual expressly halts playback. Therefore, unnecessary utilization of resources, such as processors, decoders and other power intensive resources, may occur in situations where the individual is no longer experiencing the media stream or is only experiencing a portion of the media stream (e.g., listening but not watching).

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include an apparatus having logic to determine a visibility state of an application window associated with a media stream and to selectively decode a media stream based on a visibility state. The term "visibility state" may refer to the state of an application window as blocked, in part or in whole, for example by another window, by an object, by motion, and so on, or combinations thereof. The term "visibility state" may refer to the state of an application window as visible, in part of in whole, for example to a user, and observer, and so on, or combinations thereof.

A visibility state may be determined by employing a window metric, such as window ordering or transparency, by employing a sensor, such as light or motion sensor, and combinations thereof. One or more decode operations may be prevented with respect to media content, such as video content, if for example a visibility state indicates that at least a portion of an application window is blocked. Also, one or more decode operations may be permitted with respect to media content if for example a visibility state indicates that at least a portion of the application window is visible. The apparatus may also include a demultiplexer to receive and separate one or more types of content of a media stream, for example to receive and separate video content and audio content of an audio-video stream. The apparatus may include a decoder to decode one or more types of content.

Embodiments may also include a system having logic to determine a visibility state of an application window associated with a media stream and to selectively decode a media stream based on the visibility state, in combination with components such as a power supply, memory, storage, network interface component, and combinations thereof. The system may further include dedicated components for content, such as dedicated graphics components for video content. The system may include light sensor components, such as a camera, or motion sensor components, such as an accelerometer or a gyrometer, and so on, or combinations thereof.

Additionally, embodiments may include a computer-readable storage medium having a set of instructions, which, if executed by a processor, may cause a processor to receive a media stream including one or more types of content, for example including video content. The instructions, if executed, may also cause a processor to determine a visibility state of an application window associated with a media stream. The instructions, if executed, may also cause a processor to selectively decode media content, for example selectively decode video content, based on the visibility state.

Other embodiments may involve a computer-implemented method in which a media stream may be received. The media stream may include any type of media content, such as audio content, and one or more decode operations may be permitted with respect to the media content, for example if a user is listening to the content, using the content, interfacing with the content, and combinations thereof. The computer-implemented method may also include determining a visibility state of an application window associated with a media stream including media content, such as video content. Further, the computer-implemented method may include selectively decoding media content, such as video content, based on a visibility state.

Embodiments may also include a media streaming apparatus having means for receive a media stream including video content, means for determining a visibility state of an application window associated with the media stream, and means for selectively decoding the video content based on the visibility state.

Figure 1A:
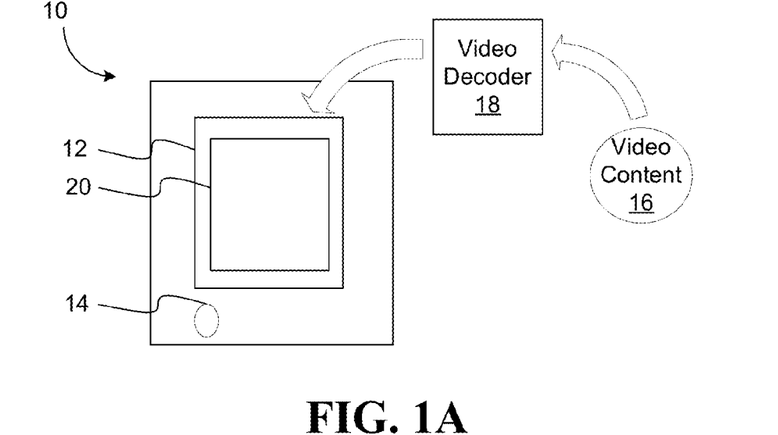
FIG. 1A is a block diagram of an example of a video display apparatus where video content is to be permitted on a visible application window according to an embodiment.

FIG. 1A shows an apparatus 10 including a screen 12 and an audio component 14, for which a visibility state of an application window 20 may be determined and for which a video content 16 may be selectively decoded by a video decoder 18 based on the visibility state. The illustrated apparatus 10 may include any video display platform such as a laptop, personal digital assistant (PDA), wireless smart phone, media content player, imaging device, mobile Internet device (MID), any smart device such as a smart phone, smart tablet, smart TV and so on, or any combination thereof. A media stream including the video content 16 might be received from, for example, a YouTube web server, video editing software, an image capture device, such as a phone camera or a TV broadcast camera, a Blu-ray player, a hard drive and so on, or any combination thereof. The video content 16 may be multiplexed with other media content, such as audio content, or may arrive at video decoder 18 separate from other media content.

The video decoder 18 may be implemented in an application, operating system, media framework, hardware component, and so on, or combinations thereof. The video decoder 18 may also be implemented as a combination decoder, such as an audio-video decoder, to perform one or more decode operations with respect to one or more media content of a media stream. There may also be one or more other decoders to perform one or more decode operations with respect to other content, such as audio content, textual content, and so on, or any combination thereof. Where an audio decoder is employed and the media stream includes audio content, the audio content may be decoded and rendered to the audio component 14, to play the audio stream on ear-buds, speakers, and so on, or combinations thereof.

The illustrated application window 20 is visible and the video decoder 18 is to perform one or more decode operations with respect to the video content 16, such that decoded video content is to be rendered and displayed on the application window 20. For example, the video content 16 may be permitted to arrive at the video decoder 18, such as by maintaining the video content 16 at any component of a video pipeline, including a network interface component, memory, operating system, application, and so on, or combinations thereof. The video content 16 may be permitted to arrive at video decoder 18 by allowing interaction with the video content 16 at any component of a video pipeline, for example by allowing access of the video content 16 to memory, allowing access of the video decoder 18 to the video content 16, allowing input or output of the video content 16 in any component of a video pipeline, and so on, or combinations thereof. The video decoder 18 may also receive the video content 16 and decode it, may decode it and render it to the application window 20, and so on, or combinations thereof.

Figure 1B:
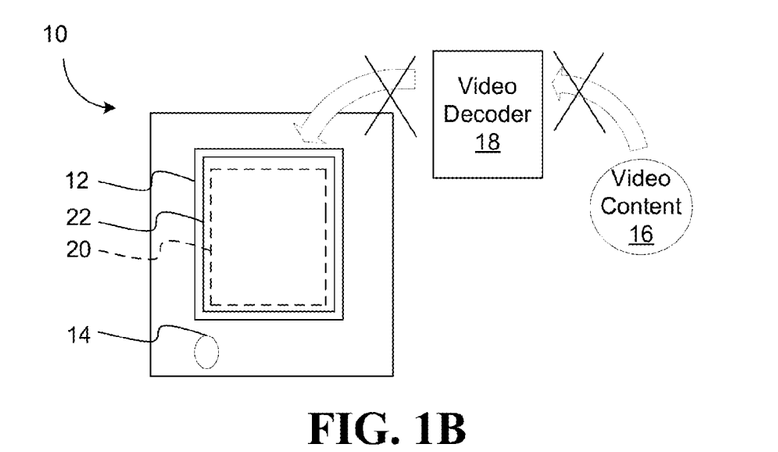
FIG. 1B is a block diagram of an example of a video display apparatus where video content is to be prevented on an application window blocked by another application window according to an embodiment.
Figure 1C:
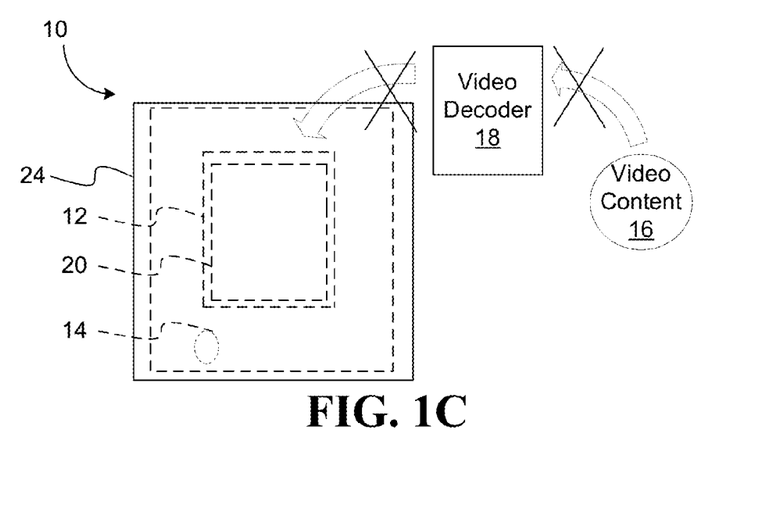
FIG. 1C is a block diagram of an example of a video display apparatus where video content is to be prevented on an application window blocked by a physical object according to an embodiment.

Turning now to FIG. 1B, the illustrated application window 20 is blocked by another application window 22, and one or more decode operations are prevented with respect the video content 16. For example, the video content 16 may be prevented from arriving at the video decoder 18, such as by dropping the video content 16 from any component of a video pipeline, including a network interface component, memory, operating system, application, and so on, or combinations thereof. The video content 16 may be prevented from arriving at the video decoder 18 by restricting interaction with the video content 16 at any component of a video pipeline, for example by restricting access of the video content 16 to memory, restricting access of the video decoder 18 to the video content 16, restricting input or output of the video content 16 in any component of a video pipeline, and so on, or combinations thereof. The video decoder 18 may also receive the video content 16 and not decode it, may decode it and not render it to the application window 20, and so on, or combinations thereof. Similarly, FIG. 1C shows that the illustrated application window 20 is blocked by a physical object 24, and one or more decode operations are prevented with respect the video content 16 based on the visibility state of the application window 20. Preventing the video content 16 from being decoded when the application 20 is blocked can preserve processing resources, reduce power consumption and extend battery life.

Where the media stream includes other media content, such as audio content, the other media content may be decoded and rendered, for example, to the audio component 14. In one embodiment, an audio-video media stream may be continually received by the apparatus 10 as part of a playlist, such as a YouTube playlist, wherein the video content 16 is displayed on the application window 16 and audio content is rendered to the audio component 14. When the application window 20 is blocked, for example by the application window 22 or the physical object 24, one or more decode operations are prevented with respect to video content 16 and one or more decode operations are permitted with respect to audio content. The application window 20 may remain blocked until the end of the playlist or until a user terminates the media stream. If the application window 20 becomes visible while the playlist continues, one or more decode operation are permitted with respect to video content, in the example shown.

Figure 2:
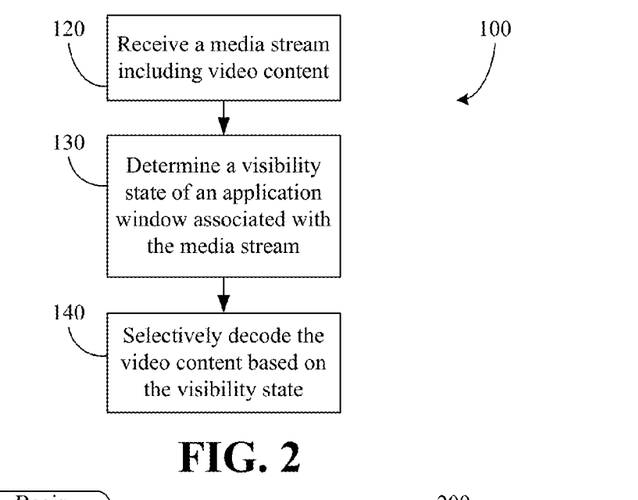
FIG. 2 is a flowchart of an example of a method of selectively decoding video content based on an application window visibility state according to an embodiment.

FIG. 2 shows a method 100 of selectively decoding video content. The method 100 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 100 may be written in any combination of one or more programming languages, including an object oriented programming language such as C++ or the like and conventional procedural programming languages, such as the "C" programming language or similar programming languages. Moreover, the method 100 could be implemented using any of the aforementioned circuit technologies.

The illustrated processing block 120 provides for receiving a media stream that includes video content. The media stream may be received from a variety of sources, including online media servers, such as YouTube web servers, disk drives, such as Blu-ray players, hard drives, memory, storage, and so on, or combinations thereof. The media stream may include one or more other content, such as audio content, textual content, and so on, or combinations thereof, which may be multiplexed or demultiplexed with the video content. The media stream may be received at any platform, such as a laptop, personal digital assistant (PDA), wireless smart phone, media content player, imaging device, mobile Internet device (MID), any smart device such as a smart phone, smart tablet, smart TV, and so on, or any combination thereof. The media stream may also be received at any stage or component of a video pipeline, including a network interface component, memory, decoder, demultiplexer, operating system, application, and so on.

The illustrated processing block 130 provides for determining a visibility state for an application window associated with the media stream. The visibility state of the application window may include a blocked state, a visible state, or combinations thereof. For example, the application window may be completely blocked, and the visibility state may indicate that the application window includes a blocked state. Also, a portion of the application window may be blocked, which may include a predefined portion of the application window based on location of the portion in the application window, area of the portion, pixel count of the portion, and so on, or combinations thereof. When a portion of the application window that is blocked exceeds a threshold block value, the visibility state may indicate that the application window includes a blocked state. The application window may also be in motion, such as when a platform including the application window is in motion. When a portion of the application window that is in motion exceeds a threshold motion value, the visibility state may indicate that the application window includes a blocked state.

The application window may be completely visible to a user, and the visibility state may indicate that the application window includes a visible state. Also, a portion of the application window may be visible, which may include a predefined portion, and the visibility state may indicate that the application window includes a visible state. A portion of the application window may be visible to a user that exceeds a threshold visible value, and the visibility state may indicate that the application window includes a visible state. The application window may be in motion, and may not exceed a threshold motion value, and the visibility state may indicate that the application window includes a visible state. In one embodiment, the application window may be observable but may include a blocked state, for example where a motion threshold of the application window is exceeded. A user may define the threshold values though policies implemented at any stage of a media pipeline, for example employing a user interface, such as graphical user interface, to specify a policy to be implemented in an application, operating system, framework, hardware, and so on, or combinations thereof.

The visibility state may also be determined by employing a window metric, wherein the window metric may include a z-ordering, which may refer to a stacking order of one or more application windows. For example, an application window displayed on a platform, such as a wireless smart phone, may be determined to be stacked over all other windows that are to be displayed on the platform. There may also be various application windows displayed on a platform, and the z-ordering may be determined to indicate a stacking order of the various application windows. The window metric may be employed to indicate that an application window stacked over all other application windows includes a visible state, or that one or more windows stacked below an uppermost application window includes a blocked state. The window metric may also include a transparency, which may refer to the opaqueness or transparency of one or more application windows. For example, two application windows may be stacked such that at least a portion of one of the application windows is transparent to display at least a portion of the other application window. The visibility metric may be employed to indicate that the application window including the displayed portion may include a visible state.

The visibility metric may further include a location, which may refer to the location of the application window relative to other application windows, relative to a display, relative to a user, and so on, and combinations thereof. For example, a light sensor, such as a camera, may be employed to provide location data indicative of a location of the application window relative to a user, such as when light sampled by the camera falls below a predetermined threshold to indicate that a platform may be in a user's pocket or that the user may not actually be viewing content on an application window. The visibility metric may be employed to indicate that the application window includes an object blocked state. The visibility metric may also include motion of an application window relative to other application windows, relative to a display, relative to a user, and so on, and combinations thereof. For example, a motion sensor such as an accelerometer or a gyrometer may be employed to determine an acceleration or a motion of an application window relative to a user, such as when the motion or acceleration exceeds a predetermined threshold to indicate that a user may be walking, running, and so on, or that the user may not actually be viewing content on an application window. A visibility metric may be employed to indicate that the application window includes a motion block state.

The illustrated processing block 140 provides for selectively decoding video content based on the visibility state. In one embodiment, one or more decode operations may be prevented with respect to media content, such as video content, if for example a visibility state indicates that at least a portion of an application window is blocked. For example, a window metric may be employed to indicate that an application window is not in a blocked state, or is in a visible state. The window metric may change, and cause a change in the visibility state from a visible state to a blocked state, wherein one or more decode operations are to be prevented with respect to the video content. In another embodiment, one or more decode operations may be permitted with respect to media content if for example a visibility state indicates that at least a portion of the application window is visible. For example, a window metric that is employed to indicate an application window is in a blocked state, or is not in a visible state, may change and cause a switch in the visibility state from a blocked state to a visible state, wherein one or more decode operations are to be permitted with respect to the video content.

Figure 3:
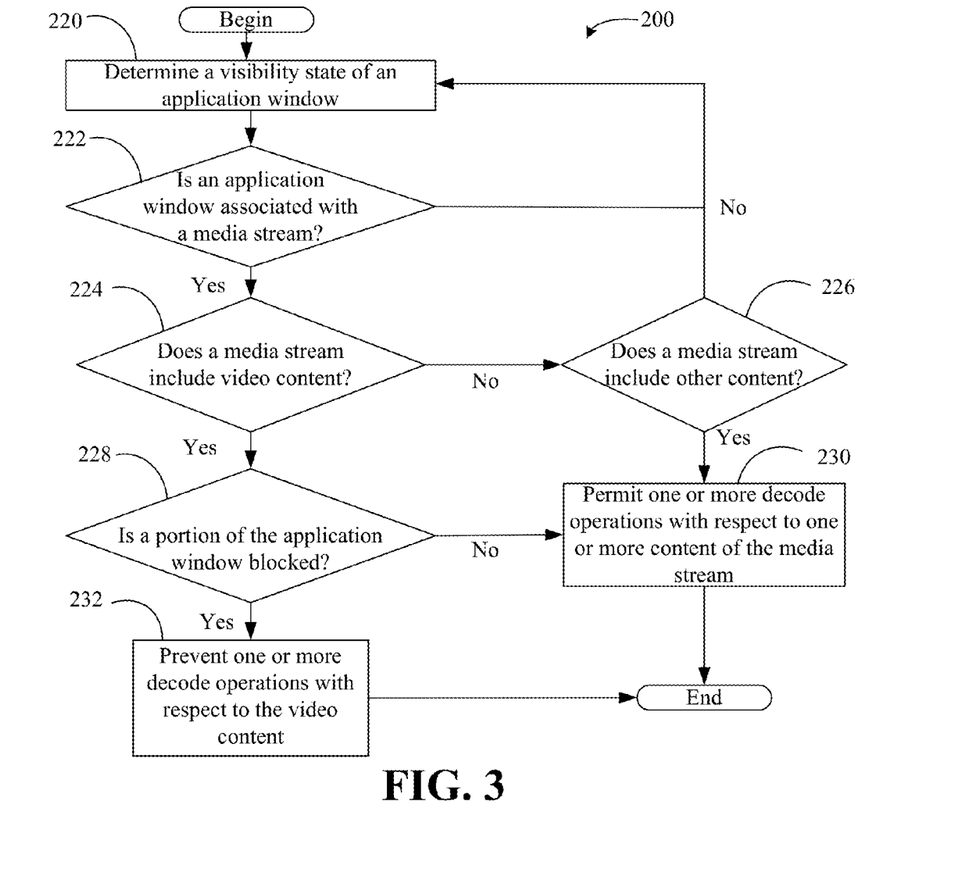
FIG. 3 is a flowchart of an example of a method of selectively decoding a media stream based on whether an application window is blocked according to an embodiment.

Turning now to FIG. 3, a method 200 provides for selectively decoding a media stream based on whether an application window is blocked. The method 200 could be implemented using any of the herein mentioned technologies, and may be implemented at any time, such as at receipt of a media stream, storage of media stream contents, processing of media stream contents, render or display of media stream contents, and so on, or combinations thereof. The illustrated processing block 220 determines a visibility state of an application window. A determination may be made at block 222 as to whether an application window is associated with a media stream. For example, a determination may be made as to whether an application window is to display the contents of a media stream, is displaying the contents of a media stream, or combinations thereof. If not, the illustrated processing block 220 may determine a visibility state of the same application window at a later time. If so, a determination may be made at block 224 as to whether the media stream includes video content. If the media stream does not include video content, a determination may be made at block 226 as to whether the media stream includes other content, such as audio content. If so, then illustrated processing block 230 permits one or more decode operations with respect to one or more types of content, such as audio content, of the media stream. If the media stream does include video content, a determination may be made at block 228 as to whether at least a portion, which may be a predefined portion, of the application is blocked. If not then the processing block 230 may permit one or more decode operations with respect to the video content. If so, then illustrated processing block 232 prevents one or more decode operations with respect to the video content.

Figure 4:
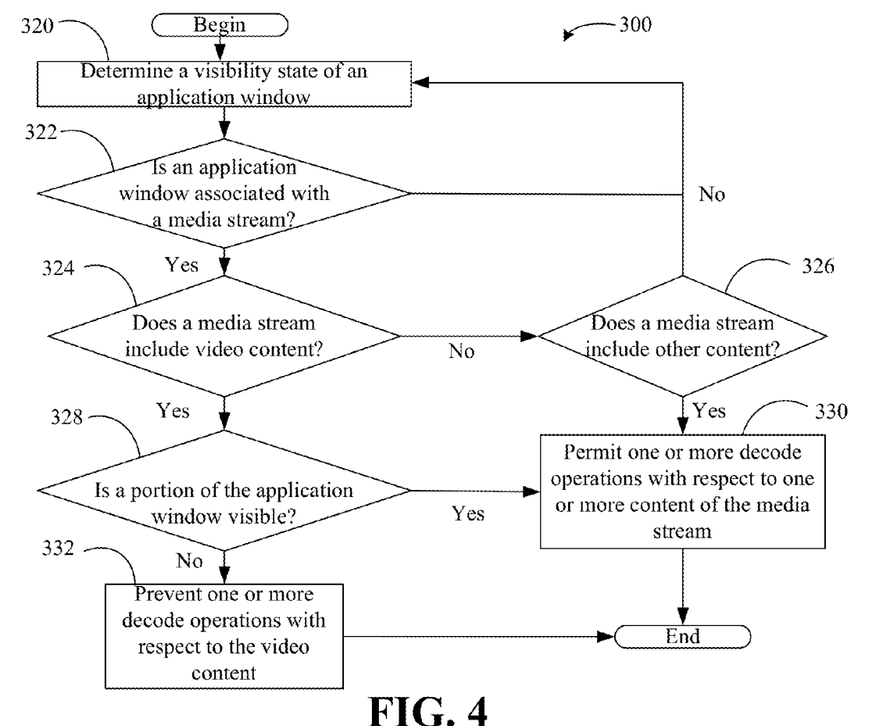
FIG. 4 is a flowchart of an example of a method of selectively decoding a media stream based on whether an application window is visible according to an embodiment.

FIG. 4 shows a method 300 that provides for selectively decoding a media stream based on whether an application window is visible. The method 300 could be implemented using any of the herein mentioned technologies, and may be implemented at any time, such as at receipt of a media stream, storage of media stream contents, processing of media stream contents, render or display of media stream contents, and so on, or combinations thereof. Illustrated processing block 320 determines a visibility state of an application window, wherein a determination may be made at block 322 as to whether an application window is associated with a media stream. For example, a determination may be made as to whether the application window is to display the contents of a media stream, is displaying the contents of a media stream, or combinations thereof. If not, illustrated processing block 320 may determine a visibility state of the same application window at a later time. If so, a determination may be made at block 324 as to whether the media stream includes video content. If the media stream does not include video content, a determination may be made at block 326 as to whether the media stream includes other content, such as audio content. If so, then processing block 330 permits one or more decode operations with respect to one or more types of content, such as audio content, of the media stream. If the media stream does include video content, a determination may be made at block 328 as to whether at least a portion, which may be a predefined portion, of the application is visible. If so then the illustrated processing block 330 permits one or more decode operations with respect to the video content. If not, then processing block 332 may prevent one or more decode operations with respect to the video content.

Figure 5:
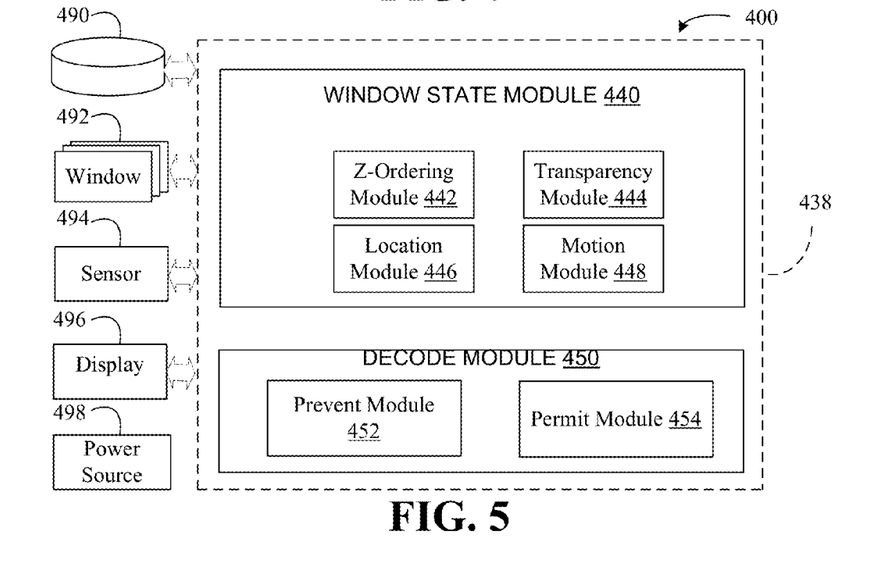
FIG. 5 is a block diagram of an example of a logic architecture according to an embodiment.

Turning now to FIG. 5, an apparatus 400 may include a logic architecture 438 having a window state module 440 and a decode module 450. The logic architecture 438 may be generally incorporated into a platform such as such as a laptop, personal digital assistant (PDA), wireless smart phone, media content player, imaging device, mobile Internet device (MID), any smart device such as a smart phone, smart tablet, smart TV and so on, or any combination thereof. The logic architecture 438 may be implemented in an application, operating system, media framework, hardware component, and so on, or combinations thereof. The logic architecture 438 may also be implemented in any component of a video pipeline, such as a network interface component, memory, processor, hard drive, decoder, demultiplexer, operating system, application, and so on, or combinations thereof. For example, the window state module 440 may be implemented in a processor, an application, a window manager, a display manager, and so on, or combinations thereof. Additionally, the decode module 450 may, for example, be implemented in a media player, media framework, hardware component, and so on, or combinations thereof.

In the illustrated example, the window state module 440 includes a z-ordering module 442 to determine a z-ordering of application windows, a transparency module 444 to determine a transparency of application windows, a location module 446 to determine a location of application windows, and a motion module 448 to determine a motion of application windows. In particular, one or more modules of the window state module 440 may be employed to determine a visibility state of an application window associated with a media stream. In one embodiment, a media stream received from storage 490 may be associated with an uppermost application window of windows 492. The z-ordering module 444 and the transparency module 446 may be employed to determine that an application window is an uppermost application window of a window stack and that the uppermost window included no (e.g., 0%) transparency. The location module 446 and the motion module 448 may utilize data from a sensor 494 to determine that display 496 or the uppermost application window of windows 492 is not blocked by object or is not substantially moving. The window state module 440 may then determine, using one or more of the modules 442, 444, 446, 448, that the visibility state of the uppermost application window associated with the media stream includes a visible state.

In the illustrated example, the decode module 450 includes a prevent module 452 to prevent one or more decode operations with respect to one or more types of content of a media stream if a visibility state indicates that at least a portion of an application window is blocked, and a permit module 454 to permit one or more decode operations with respect to one or more media content if a visibility state indicates that at least a portion of an application window is visible. In one embodiment, if the window state module 440 determines that the visibility state of one of the application windows 492 associated with a video stream includes a blocked state, the prevent module 452 may prevent one or more decode operations with respect to the video content of the media stream. If, for example, the window state module 440 determines that the visibility state of one of the application windows 492 associated with a video stream includes a visible state, the permit module 450 may permit one or more decode operations with respect to the video content.

In one embodiment, if an application window 492 includes a visible state, one or more decode operations may be also be permitted with respect to video content by not allowing the prevent module 452 to operate. For example, the prevent module 452 may be prevented from operating by instruction, may not be initiated to perform an operation, and so on, or combinations thereof. Similarly, in another embodiment, if an application window 492 includes a blocked state, one or more decode operations may be prevented with respect to the video content by not allowing the permit module 454 to operate.

The apparatus 400 may include further components, such as power source 498 (e.g., battery) to supply power to the apparatus 400. As will be discussed in greater detail, the apparatus 400 may include a demultiplexer (not shown) to receive or separate one or more types of content of the media stream, such as an audio-video demultiplexer to receive and separate audio and video content. The apparatus 400 may also include a decoder (not shown), to decode one or more types of content of the media stream, such as an audio-video decoder to decode audio and video content. The apparatus 400 may include a network interface component to provide communication functionality for a wide variety of purposes, such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning Systems (GPS), spread spectrum (e.g., 900 MHz), and other radio frequency (RF) telephony purposes. In one example, a demultiplexer, a decoder, a network interface component, and so on, may be implemented in the same stage or component of a content pipeline.

Figure 6:
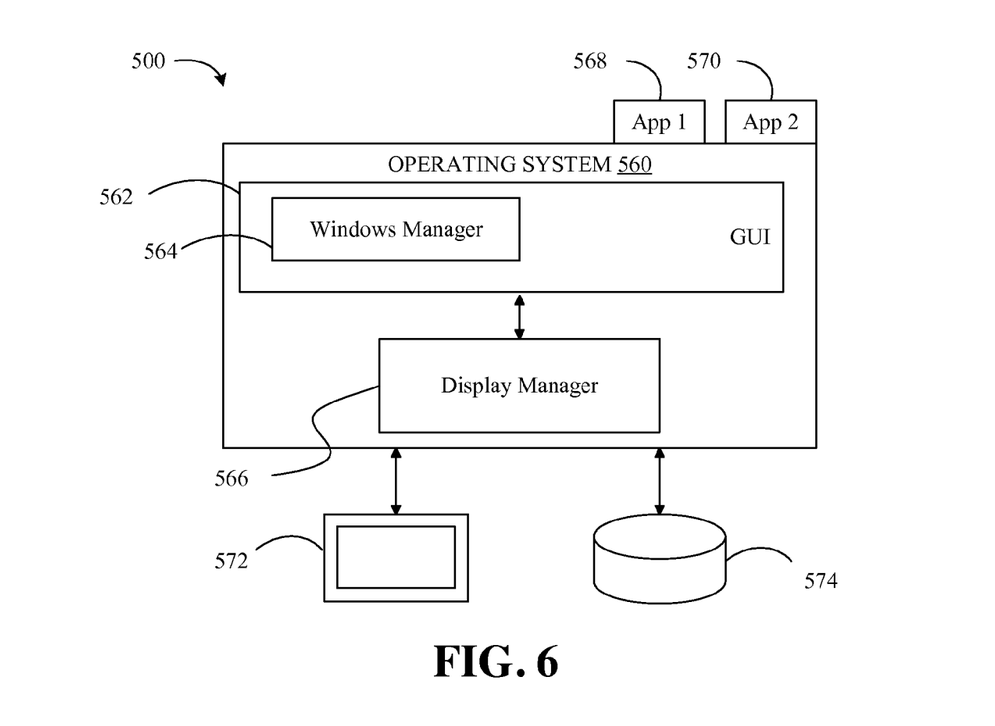
FIG. 6 is a block diagram of an example of a window state module implementation according to an embodiment.

FIG. 6 shows a window state module implementation 500. The illustrated operating system 560 includes a display manager 566, which may control the information that is presented to a display platform 572 to display data to a user. The display platform 572 may include a laptop, personal digital assistant (PDA), wireless smart phone, media content player, imaging device, mobile Internet device (MID), any smart device such as a smart phone, smart tablet, smart TV and so on, or combinations thereof. The data may include media content, for example video content, audio content, textual content, and so on, or combinations thereof. In the illustrated example, storage 574 includes the data.

The illustrated operating system 560 may also include a graphical user interface 562 that may interact with the display manager 566 to present information on the display platform 572. For example, the graphical user interface 562 may provide the display manager 566 with data that describes the appearance and position of windows, icons, control elements and similar types of user interface objects. The graphical user interface 562 may provide this information directly to the display manager 566, or via a windows manager 564. The windows manager 564 may control the display of windows in which data is presented to a user through applications programs 568, 570, such as a media player. In one embodiment, the window state module may be implemented in application programs 568, 570, window manager 564, display manager 566, or combinations thereof, such that a visibility state may be determined of an application window associated with a media stream to be rendered or displayed.

Figure 7:
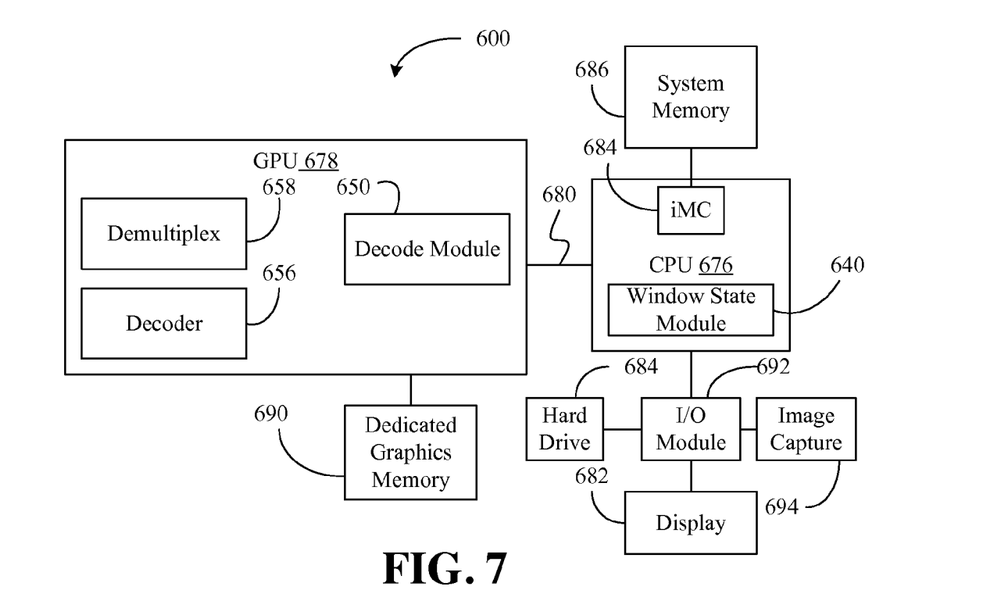
FIG. 7 is a block diagram of an example of a media content computing system according to an embodiment.

Turning now to FIG. 7, a media content computing system 600 is shown in which a visibility state of an application window associated with a media stream is to be determined, and in which the media stream is to be selectively decoded based on the visibility state. The computing system 600 may be part of a mobile platform such as a laptop, PDA, wireless smart phone, media player, imaging device, MID, any smart device such as a smart phone, smart tablet and so on, or any combination thereof. The computing system 600 may also be part of a fixed platform such as a personal computer (PC), smart TV, server, workstation, etc. The illustrated computing system 600 includes one or more CPUs (central processing units) 676, a display device 682, a hard disk drive 684 and system memory 686, which could include, for example, double data rate (DDR) synchronous dynamic random access memory (SDRAM, e.g., DDR3 SDRAM JEDEC Standard JESD79-3C, April 2008) modules. The modules of the system memory 686 may be incorporated into a single inline memory module (SIMM), dual inline memory module (DIMM), small outline DIMM (SODIMM), and so on.

The computing system 600 may include a graphics bus (e.g., slot) 680, wherein a graphics card (not shown) containing a graphics processing unit (GPU) 678 and dedicated graphics memory 690 could be coupled (e.g., plugged into) to the graphics bus 680. For example, the graphics bus 680 could include a PCI Express Graphics (PEG, e.g., Peripheral Components Interconnect/PCI Express x16 Graphics 150W-ATX Specification 1.0, PCI Special Interest Group) bus, an Accelerated Graphics Port (e.g., AGP V3.0 Interface Specification, September 2002) bus, and so on. The CPUs 676 may have an integrated memory controller (iMC) 685, and one or more processor cores (not shown) to execute one or more drivers associated with a host OS (operating system) and/or application software, wherein each core may be fully functional with instruction fetch units, instruction decoders, level one (L1) cache, execution units, and so on. The CPUs 676 could alternatively communicate with an off-chip variation of the iMC 685, also known as a Northbridge, via a front side bus. The illustrated CPUs 676 communicate with an input/output (I/O) module 692, also known as a Southbridge, via a hub bus. The iMC 684/CPUs 676 and the I/O module 692 are sometimes referred to as a chipset, or may be implemented together as a system-on-chip (SoC) architecture.

The illustrated computing system 600 also includes a window state module 640 to determine a visibility state of an application window associated with a media stream, and a decode module 650 to selectively decode a media stream based on the visibility state. The illustrated window state module 640 is implemented in the CPUs 676, although it may also be implemented in the GPU 678. Similarly, the illustrated decode module 650 is implemented in the GPU 678, although it may also be implemented in the CPUs 676. The image capture module 694 may include, for example, a camera, camcorder, etc., to capture an image, including a video image. Media content, such as video content, may also be obtained from software running on the CPUs 676, from the hard drive 684, from an off-platform device (e.g., web server, remote image capture device, etc.) via a network controller (not shown), from dedicated graphics memory 690, and so on, and combinations thereof.

The illustrated computing system 600 further includes a decoder 656 to decode one or more types of content of a media stream, and a demultiplexer 658 to separate one or more types of content from a media stream. The illustrated decoder 656 and demultiplexer 658 are implemented at the same stage and component of a video pipeline. The illustrated decoder 656 and demultiplexer 658 may be implemented in a hardware stage of a media pipeline, for example where a full media stream (e.g., full MPEG-2) is received, demultiplexed, decoded and rendered entirely in hardware. In one embodiment, for example where a demultiplexer and a decoder are implemented in different stages of a media pipeline, a demultiplexer may be implemented in an application, framework, operating system, and so on, and a decoder may be implemented in a hardware component, such as a processor, and vice-versa. An operation may also span one or more stages or components of a media pipeline, for example where a first content is decoded in an application, framework, operating system, and so on, and a second content is decoded in a hardware component. For example, audio content (e.g., MP3) may be decoded in an application and video content may be decoded in a hardware component.

In one embodiment, a media stream is to be received, for example from the image capture module 694, and is to be displayed in an application window associated with the media stream. The illustrated window state module 640 is to be implemented by the CPUs 676 to determine the visibility state of an application window associated with a media stream, which may be communicated to the decode module 650 via the graphics bus 680. The decode module 650 may selectively decode the media stream based on a visibility state.

In one embodiment, one or more instructions may configure the decode module 650 on the GPU 678 to permit one or more decode operations with respect to media content if the visibility state indicates that at least a portion of the application window is visible. For example, media content including video content may be permitted to arrive at the decoder 650 by maintaining the video content at any component of a video pipeline, including a network interface component (not shown), the memory 690, and so on, or combinations thereof. Media content may be permitted to arrive at the decoder 650 by allowing interaction with the media content at any component of a video pipeline, for example by allowing access of media content to the dedicated graphics memory 690, to the system memory 686, and so on, by allowing access of the decoder 650 to the media content, allowing input or output of media content in any component of a video pipeline, and so on, or combinations thereof. The decoder 650 may receive media content and decode it from the demultiplexer 658, the dedicated graphics memory 690, the image capture module 694, the hard drive 684, a network interface component (not shown), and so on, or combinations thereof. The decoder 650 may render the media content to an application window on the display device 682.

In one embodiment, one or more instructions may configure the decode module 650 on the GPU 678 to prevent one or more decode operations with respect to media content if the visibility state indicates that at least a portion of the application window is blocked. For example, media content including video content may be prevented from arriving at the decoder 650, such as by dropping the video content at any component of a video pipeline, including a network interface component (not shown), the memory 690, and so on, or combinations thereof. Media content may be prevented from arriving at the decoder 650 by restricting interaction with media content at any component of a video pipeline, for example by restricting access of media content to the dedicated graphics memory 690, to the system memory 686, and so on, by restricting access of the decoder 650 to media content, restricting input or output of media content in any component of a video pipeline, and so on, or combinations thereof. The decoder 650 may receive media content and not decode it, may decode it and not render to an application window on the display device 682, and so on, or combinations thereof. The demultiplexer 658 may not receive or separate media content, or may not provide demultiplexed media content to the decoder 650, and so on, or combinations thereof.

Figure 8:
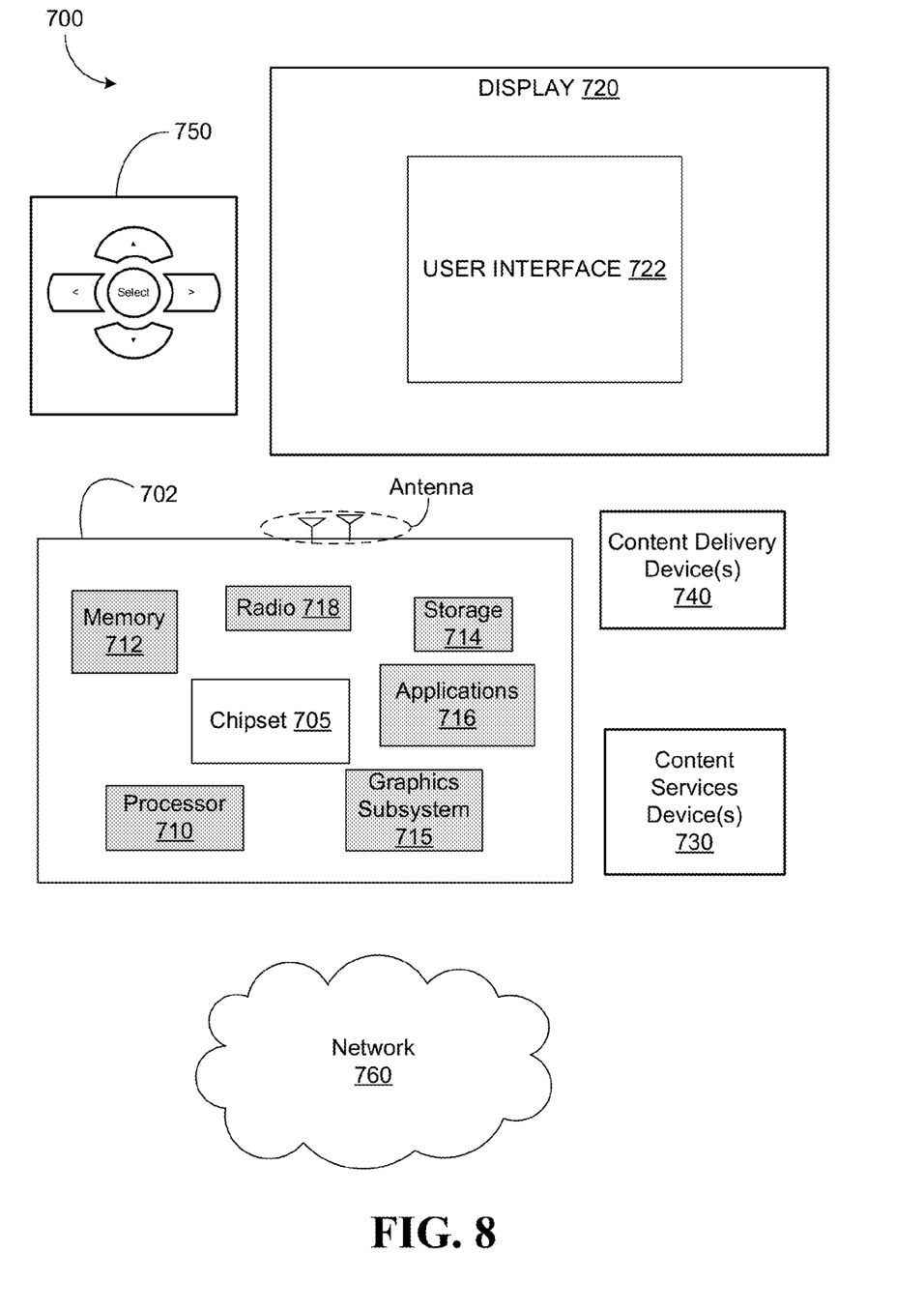
FIG. 8 is a block diagram of an example of a system including a window state module and a decode module according to an embodiment.

FIG. 8 illustrates an embodiment of a system 700 that may implement logic to selectively decode a media stream. For example, the logic may include logic architecture 438 (FIG. 5), previously discussed. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so on.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
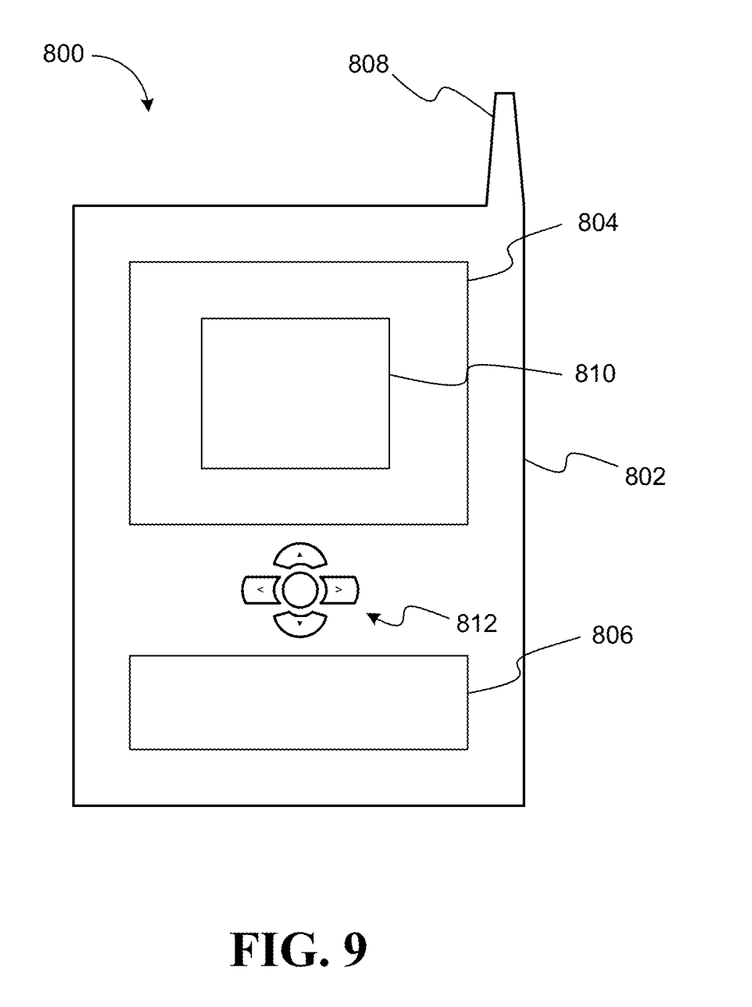
FIG. 9 is a block diagram of an example of a system having a small form factor according to an embodiment.

As described above, system 700 may be embodied in varying physical styles or form factors. FIG. 9 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Techniques described herein may therefore provide a logic and/or system that may determine a visibility state of an application window associated with a media stream and/or selectively decode media content, such as video content, based on the visibility sate. In particular, one or more instructions may configure a processor to prevent one or more decode operations with respect to the video content if a visibility state indicates that at least a portion of the application window includes a blocked state. One or more instructions may, for example, configure a processor to permit one or more decode operations with respect to media content, such as video content, if a visibility state indicates that at least a portion of the application window includes a visible state. Selective decode of a media stream may be beneficial to resource utilization, such as processor utilization, power utilization, and so on. For example, the base assumption that a media stream is always active and present on a screen may be ignored, and the media stream can be selectively decoded to reduce processor utilization. In one embodiment, reducing processor utilization in a hardware accelerated audio-video decode by decoding only audio content when a user is not actually watching video content may save power for a platform. Selective decode may also be beneficial to collect or leverage data associated with actual user use, which may be employed for various services, including directed advertisement. For example, knowing that a user is not actually watching a video may effect view statistics, such as YouTube view metrics, of interest to advertisers, and so on. Data may be collected based on a visibility state, a prevent or permit operation, etc.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A method comprising:
   receiving a media stream including video content;
   determining, by a processor, a visibility state of an application window that is to be associated with the media stream and that is to be rendered on a display of an apparatus; and
   selectively decoding, by a processor, the media stream based on the visibility state of the application window, wherein the selectively decoding comprises:
      preventing one or more decode operations with respect to the video content in response to determining that the visibility state of the application window indicates the video content is displayed and is observable by an observer via the application window but the video content is not being viewed by the observer, wherein an indication that the video content is not being viewed by the observer is based on motion sensor data from the apparatus that indicates at least a portion of the application window is being blocked from view by motion of the application window relative to the observer that is to include the application window physically moving in excess of a threshold motion value; and
      permitting, when the application window is an uppermost application window of z-ordering application windows and includes no transparency, the one or more decode operations with respect to the video content in response to determining that the visibility state of the application window indicates the uppermost application window is not being blocked based on motion sensor data from the apparatus.

2. The method of claim 1, wherein the media stream further includes audio content corresponding to the video content, and the decoding permits one or more decode operations with respect to the audio content when the one or more decode operations with respect to the video content are prevented.

3. The method of claim 1, wherein the decoding is to prevent one or more decode operations with respect to the video content when the visibility state of the application window indicates that the video content is displayed and is observable via the application window, but the video content is not being viewed by the observer in response to a determination that at least a portion of the application window is being blocked from view by at least one other application window via an arrangement of the other application window relative to the application window.

4. The method of claim 3, wherein the decoding permits the one or more decode operations with respect to the video content when the visibility state of the application window includes a visible state that indicates the video content is displayed and is observable via the application window and the video content is being viewed by the observer based on a determination that the portion of the application window is visible to the observer in response to one or more of a change in the arrangement that is to cause the portion of the application window to no longer be blocked from view by the other application window and a change of motion of the application window relative to the observer that is to no longer include the application window physically moving in excess of the threshold motion value.

5. The method of claim 1, wherein the decoding permits one or more decode operations with respect to the video content based on motion sensor data from the apparatus that is to indicate the application window is visible to the observer in response to a change of motion of the application window relative to the observer that is to no longer include the application window physically moving in excess of the threshold motion value.

6. A non-transitory computer-readable medium comprising one or more instructions that when executed on a processor cause the processor to:
   receive a media stream including video content;
   determine a visibility state of an application window that is to be associated with the media stream and that is to be rendered on a display of an apparatus; and
   selectively decode the media stream based on the visibility state of the application window, wherein the selectively decode comprises:
      to prevent one or more decode operations with respect to the video content in response to a determination that the visibility state of the application window is to indicate the video content is displayed and is observable by an observer via the application window but the video content is not being viewed by the observer, wherein an indication that the video content is not being viewed by the observer is to be based on motion sensor data from the apparatus that is to indicate at least a portion of the application window is being blocked from view by motion of the application window relative to the observer that is to include the application window physically moving in excess of a threshold motion value; and to permit, when the application window is to be an uppermost application window of z-ordering application windows and is to include no transparency, the one or more decode operations with respect to the video content in response to a determination that the visibility state of the application window is to indicate the uppermost application window is not being blocked based on motion sensor data from the apparatus.

7. The non-transitory computer-readable medium of claim 6, wherein the media stream further includes audio content corresponding to the video content, and when executed the one or more instructions configure a processor to permit one or more decode operations with respect to the audio content when the one or more decode operations with respect to the video content are prevented.

8. The non-transitory computer-readable medium of claim 6, wherein when executed the one or more instructions configure a processor to determine a z-ordering of the application window and at least one other application window, a transparency of the application window and the other application window, and a location of the application window and the other application window.

9. The non-transitory computer-readable medium of claim 6, wherein when executed the one or more instructions configure a processor to determine that a portion of the application window is further blocked by a physical object including a garment of the observer.

10. The non-transitory computer-readable medium of claim 6, wherein when executed the one or more instructions configure a processor to prevent one or more decode operations with respect to the video content when the visibility state of the application window indicates that the video content is displayed and is observable via the application window, but the video content is not being viewed by the observer in response to a determination that at least a portion of the application window is being blocked from view by at least one other application window via an arrangement of the other application window relative to the application window.

11. The non-transitory computer-readable medium of claim 10, wherein the one or more decode operations are to be prevented when the portion of the application window that is blocked exceeds a threshold value including a threshold block value indicative of an amount the application window is blocked by the other application window.

12. The non-transitory computer-readable medium of claim 10, wherein when executed the one or more instructions configure a processor to permit the one or more decode operations with respect to the video content when the visibility state of the application window is to include a visible state that indicates the video content is displayed and is observable by the observer via the application window and the video content is being viewed by the observer based on a determination that the portion of the application window is visible to the observer in response to one or more of a change in the arrangement that is to cause the portion of the application window to no longer be blocked from view by the other application window and a change of motion of the application window relative to the observer that is to no longer include the application window physically moving in excess of the threshold motion value.

13. An electronic apparatus comprising: a motion module to determine movement of an application window that is to be associated with a media stream including video content and that is to be rendered on a display of the apparatus;

a window state module to determine the visibility state of the application window;

a decode module to selectively decode the media stream based on the visibility state of the application window, wherein the selectively decoding comprises:

to prevent one or more decode operations with respect to the video content in response to a determination that the visibility state of the application window is to indicate the video content is displayed and is observable by an observer via the application window but the video content is not being viewed by the observer, wherein an indication that the video content is not being viewed by the observer is to be based on motion sensor data from the apparatus that is to indicate at least a portion of the application window is being blocked from view by motion of the application window relative to the observer that is to include the application window physically moving in excess of a threshold motion value; and to permit, when the application window is to be an uppermost application window of z-ordering application windows and is to include no transparency, the one or more decode operations with respect to the video content in response to a determination that the visibility state of the application window is to indicate the uppermost application window is not being blocked based on motion sensor data from the apparatus; and a processor to implement one or more of the window state module, the motion module, and the decode module.

14. The apparatus of claim 13, further including:

a z-ordering module to determine a z-ordering of the application window and at least one other application window;

a transparency module to determine a transparency of the application window and the other application window; and a location module to determine a location of the application window and the other application window.

15. The apparatus of claim 13, wherein the window state module is to be implemented in one or more of a window manager and a display manager.

16. The apparatus of claim 13, wherein the decode module is to be implemented in one or more of a media player, a media framework and a media hardware component.

17. The apparatus of claim 13, further including one or more of:

a demultiplexer to separate at least one content of the media stream; and a decoder to decode at least one content of the media stream.

18. The apparatus of claim 13, wherein the decode module is to prevent one or more decode operations with respect to the video content when the visibility state of the application window indicates that the video content is displayed and is observable via the application window, but the video content is not being viewed by the observer in response to a determination that at least a portion of the application window is being blocked from view by at least one other application window via an arrangement of the other application window relative to the application window.

19. The apparatus of claim 18, further including a permit module to permit the one or more decode operations with respect to the video content when the visibility state of the application window is to include a visible state that indicates the video content is displayed and is observable by the observer via the application window and the video content is being viewed by the observer based on a determination that the portion of the application window is visible to the observer in response to one or more of a change in the arrangement that is to cause the portion of the application window to no longer be blocked from view by the other application window and a change of motion of the application window relative to the observer that is to no longer include the application window physically moving in excess of the threshold motion value.

20. A system comprising:
a power source to supply power to the system;
a motion module to determine movement of an application window that is to be associated with a media stream including video content and that is to be rendered on a display of an apparatus;
a window state module to determine a visibility state of the application window; and
a decode module to selectively decode the media stream based on the visibility state of the application window, wherein the selectively decoding comprises:
to prevent one or more decode operations with respect to the video content in response to a determination that the visibility state of the application window is to indicate the video content is displayed and is observable by an observer via the application window but the video content is not being viewed by the observer, wherein an indication that the video content is not being viewed by the observer is to be based on motion sensor data from the apparatus that is to indicate at least a portion of the application window is being blocked from view by motion of the application window relative to the observer that is to include the application window physically moving in excess of a threshold motion value; and
to permit, when the application window is to be an uppermost application window of z-ordering application windows and is to include no transparency, the one or more decode operations with respect to the video content in response to a determination that the visibility state of the application window is to indicate the uppermost application window is not being blocked based on motion sensor data from the apparatus.

21. The system of claim 20, further including:
a z-ordering module to determine a z-ordering of the application window at least one other application window;
a transparency module to determine the transparency of the application window and the other application window; and
a location module to determine the location of the application window and the other application window.

22. The system of claim 21, further including a sensor to provide location data to the location module.

23. The system of claim 20, wherein the window state module is to be implemented in one or more of a window manager and a display manager.

24. The system of claim 20, further including one or more of:
a demultiplexer to separate at least one content of the media stream; and
a decoder to decode at least one content of the media stream.

25. The system of claim 20, wherein the decode module is to prevent one or more decode operations with respect to the video content when the visibility state of the application window indicates that the video content is displayed and is observable via the application window, but the video content is not being viewed by the observer in response to a determination that at least a portion of the application window is being blocked from view by at least one other application window via an arrangement of the other application window relative to the application window.

26. The system of claim 25, further including a permit module to permit the one or more decode operations with respect to the video content when the visibility state of the application window is to include a visible state that indicates the video content is displayed and is observable via the application window, and the video content is being viewed by the observer based on a determination that the portion of the application window is visible to the observer in response to one or more of a change in the arrangement that is to cause the portion of the application window to no longer be blocked from view by the other application window and a change of motion of the application window relative to the observer that is to no longer include the application window physically moving in excess of the threshold motion value.

* * * * *